United States Patent [19]

Kyrtsos et al.

[11] Patent Number: 5,442,558
[45] Date of Patent: Aug. 15, 1995

[54] METHOD AND SYSTEM FOR DETERMINING VEHICLE POSITION BASED ON A PROJECTED POSITION OF A SATELLITE

[75] Inventors: Christos T. Kyrtsos, Peoria; Adam J. Gudat, Edelstein, both of Ill.

[73] Assignee: Caterpillar Inc., Peoria, Ill.

[21] Appl. No.: 925,150

[22] Filed: Aug. 6, 1992

[51] Int. Cl.$^6$ .................................................. G01S 5/02
[52] U.S. Cl. ................................... 364/449; 364/453; 73/178 R; 340/988; 342/357; 342/450
[58] Field of Search ............... 364/443, 449, 453; 340/988, 989, 991, 993, 995; 342/352, 357, 358, 450, 453, 457, 463; 73/178 R

[56] References Cited

U.S. PATENT DOCUMENTS

| | | | |
|---|---|---|---|
| 3,630,079 | 12/1971 | Hughes | 73/178 R |
| 4,731,613 | 3/1988 | Endo et al. | 342/357 |
| 4,758,959 | 7/1988 | Thoone et al. | 364/449 X |
| 4,899,285 | 2/1990 | Nakayama et al. | 364/453 |
| 4,903,212 | 2/1990 | Yokouchi et al. | 364/449 |
| 4,918,609 | 4/1990 | Yamawaki | 364/449 |
| 4,924,699 | 5/1990 | Kuroda et al. | 73/178 R |
| 5,111,209 | 5/1992 | Toriyama | 342/357 |
| 5,148,179 | 9/1992 | Allison | 342/357 |
| 5,323,322 | 6/1994 | Mueller et al. | 364/449 |

OTHER PUBLICATIONS

"A Common Co-Ordinate System for the Utilization of Data from Several Radars," M. I. T. Lincoln Library, by Daniel Goldberg, Sep. 1954.

"Benefits of Integrating GPS and Inertial Navigation Systems," by Triveni N. Upadhyay et al., The Charles Stark Draper Lab., Inc., Jun. 1982.

"GPS/PLRS Aided Inertial Land Navigation System Performance" by Sam C. Bose, IEEE Position Location and Navigation Symposium, Nov. 1986.

"Satellite Navigation Systems for Land Vehicles" by Ronald A. Dork, IEEE AES Magazine, May 1987.

Article entitled "NAVSTAR: Global Positioning System—Ten Years Later" by Bradford W. Parkinson and Stephen W. Gilbert published in *Proceedings of the IEEE*, vol. 71, No. 10, Oct., 1983.

*Primary Examiner*—Kevin J. Teska
*Assistant Examiner*—Collin W. Park
*Attorney, Agent, or Firm*—James R. Yee

[57] ABSTRACT

The present invention includes a system for estimating the terrestrial position of a vehicle. The system receives electromagnetic signals from a plurality of sources and responsively producing respective ranges from each of said sources to said vehicle and respective positions of each of said sources. The system projects the position of one of said sources to the opposite side of the Earth and responsively determining a projected position and a projected range. The vehicle's position is determined as a function of said ranges and positions.

28 Claims, 12 Drawing Sheets

METHOD AND SYSTEM FOR DETERMINING VEHICLE POSITION BASED ON A PROJECTED POSITION OF A SATELLITE

TECHNICAL FIELD

The present invention relates generally to position determining systems, and more particularly, to a system and method for determining the terrestrial position of a vehicle at or near the surface of the Earth.

BACKGROUND ART

Several national governments, including the United States (U.S.), are presently developing a terrestrial position determination system, referred to generically as a global positioning system or GPS. Global positioning systems include a number of satellites placed in orbit around the Earth. The GPS satellites are designed to transmit electromagnetic signals. From these electromagnetic signals, the absolute or terrestrial position, that is, position with respect to the Earth's center, of any GPS receiver at or near the Earth's surface can ultimately be determined.

The U.S. government has designated its global positioning system, NAVSTAR. It is anticipated that the NAVSTAR GPS will be declared operational by the U.S. government in 1993. The NAVSTAR GPS envisions four orbiting GPS satellites in each of six orbits. A total of 24 GPS satellites will be in orbit at any given time with twenty-one (21) GPS satellites in operation and three (3) satellites serving as spares. The six (6) orbits will have mutually orthogonal planes with respect to the Earth. The orbits will be neither polar nor equatorial. Furthermore, the GPS satellites will complete one orbit approximately every twelve (12) hours.

Using the NAVSTAR GPS, the relative distance or range from each orbiting GPS satellite with respect to any GPS receiver can be determined using the electromagnetic signals. The relative distance from a satellite to the receiver is commonly referred to as a pseudorange.

In the NAVSTAR GPS, electromagnetic signals are continuously transmitted from all of the GPS satellites at a single carrier frequency. However, each of the GPS satellites has a different gold code, thereby allowing for differentiation of the signals. In the NAVSTAR GPS, the carrier frequency is modulated using a pseudorandom signal which is unique to each GPS satellite. Consequently, the orbiting satellites in the NAVSTAR GPS can be identified when the carrier frequencies are demodulated.

Furthermore, the NAVSTAR GPS envisions two modes of modulating the carrier wave signal using pseudorandom number (PRN) signals. In one mode, referred to as the "coarse/acquisition" or "C/A" mode, the PRN signal is a gold code sequence having a chip rate of 1.023 MHz. The gold code sequence is a conventional pseudorandom sequence well known in the art. A chip is one individual pulse of the pseudorandom code. The chip rate of a pseudorandom code sequence is the rate at which the chips in the sequence are generated. Consequently, the chip rate is equal to the code repetition rate divided by the number of members in the code. Accordingly, with respect to the C/A mode, there exists 1.023 chips in each gold code sequence and the sequence is repeated once every millisecond. Use of the 1.023 MHz gold code sequence from four GPS satellites enables the terrestrial position of an Earth receiver to be determined with an approximate accuracy of 60-300 meters.

The second mode of modulation in the NAVSTAR GPS is commonly referred to as the "precise" or "protected" (P) mode. In the P mode, the pseudorandom code has a chip rate of 10.23 MHz. Moreover, the P mode sequences are extremely long, so that the sequences repeat no more than once every 267 days. As a result, the terrestrial position of any Earth receiver can be determined to within an approximate accuracy of 16-30 meters.

However, the P mode sequences are held in secrecy by the U.S. government and are not made publicly available. In other words, the P mode is intended for use only by Earth receivers authorized by the U.S. government.

For more a detailed discussion on the NAVSTAR GPS, see Parkinson, Bradford W. and Gilbert, Stephen W., "NAVSTAR: Global Positioning System—Ten Years Later, "*Proceedings of the IEEE,* Vol. 71, No. 10, October 1983, which is incorporated herein by reference. For a detailed discussion of a vehicle positioning/navigation system which uses the NAVSTAR GPS, see U.S. patent appl. Ser. No. 07/628,560, entitled "Vehicle Position Determination System and Method", filed Dec. 3, 1990, which is incorporated herein by reference.

In order for Earth receivers to differentiate the various C/A signals from different satellites, the receivers usually include a plurality of different gold code sources for locally generating gold code sequences. Each locally derived gold code sequence corresponds with each unique gold code sequence from each of the GPS satellites.

Pseudoranges are determined by measuring the propagation time delays between the time of transmission and the time of reception of the electromagnetic signals. In the NAVSTAR GPS, the electromagnetic signals are encoded continuously with the time at which the signals are transmitted from the GPS satellites. The transmission time can be subtracted from the reception time to determine a time delay. From the calculated time delay, the pseudorange can be accurately derived by multiplying the propagation time by the speed of transmission (approximately $2.99792458 * 10^8$ m/s).

The absolute position of any GPS receiver can be determined using the pseudoranges of at least three GPS satellites via simple geometric theory involving triangulation methods. The accuracy of the terrestrial position estimate is partially dependent upon the number of GPS satellites that are sampled. Using more GPS satellites in the computation can increase the accuracy of the terrestrial position estimate.

Conventionally, four GPS satellites are sampled to determine each terrestrial position estimate. Triangulation can be accomplished using three satellites. A fourth satellite is used to correct for errors contributed by circuit clock differentials among the GPS receivers and the GPS satellites. Clock differentials may be as large as several milliseconds. Ideally, there are more than four satellites "visible" to the receiver. That is, the receiver receives signals from more than four satellites. In this case, the four satellites are used which give the most accurate position. The selected four satellites are normally referred to as a constellation.

The accuracy of the position estimate is ultimately dependent upon the spatial relationship between the satellites in the constellation. That is, even if the "best" four satellites are chosen from a number of visible satellites, the accuracy of the position determination may vary from constellation to constellation. The "ideal" constellation of four satellites comprises one satellite directly overhead the receiver and three satellites equidistant from each other and from the receiver. Deviations from the "ideal" constellation decrease the position estimate's accuracy.

For example, the problem would be exacerbated by two satellites in relative close proximity to each other. The pseudorange from each satellite can be viewed as giving a specific geometric region or area on the surface of the Earth in which the receiver is in. Each additional pseudorange further constrains this region. The further apart two satellites are from each other, the less their two regions will overlap. That is, each pseudorange will have a greater constraining effect on the position estimate. In contrast, the closer the two satellites are spatially, the more the regions will coincide and the smaller the constraining effect. This increases the position estimate's error.

The present invention is adapted to overcome one or more of the problems as set forth above.

DISCLOSURE OF THE INVENTION

In one aspect of the present invention, a system for estimating the position of a vehicle is provided. The system receives electromagnetic signals from a plurality of sources and responsively produces respective ranges from each of the sources to the vehicle and respective positions of each of the sources. The system projects the position of one of the sources to the opposite side of the Earth and responsively determines the position of the vehicle.

In another aspect of the present invention, a method for estimating the position of a vehicle is provided. The method includes the steps of receiving electromagnetic signals from a plurality of sources and responsively producing respective ranges from each of the sources to the vehicle and respective positions of each of the sources. The method further includes the steps of projecting the position of one of the sources to the opposite side of the Earth, determining a projected position and a projected range, and responsively determining the position of the vehicle.

BEST MODE FOR CARRYING OUT THE INVENTION

Figure 1:
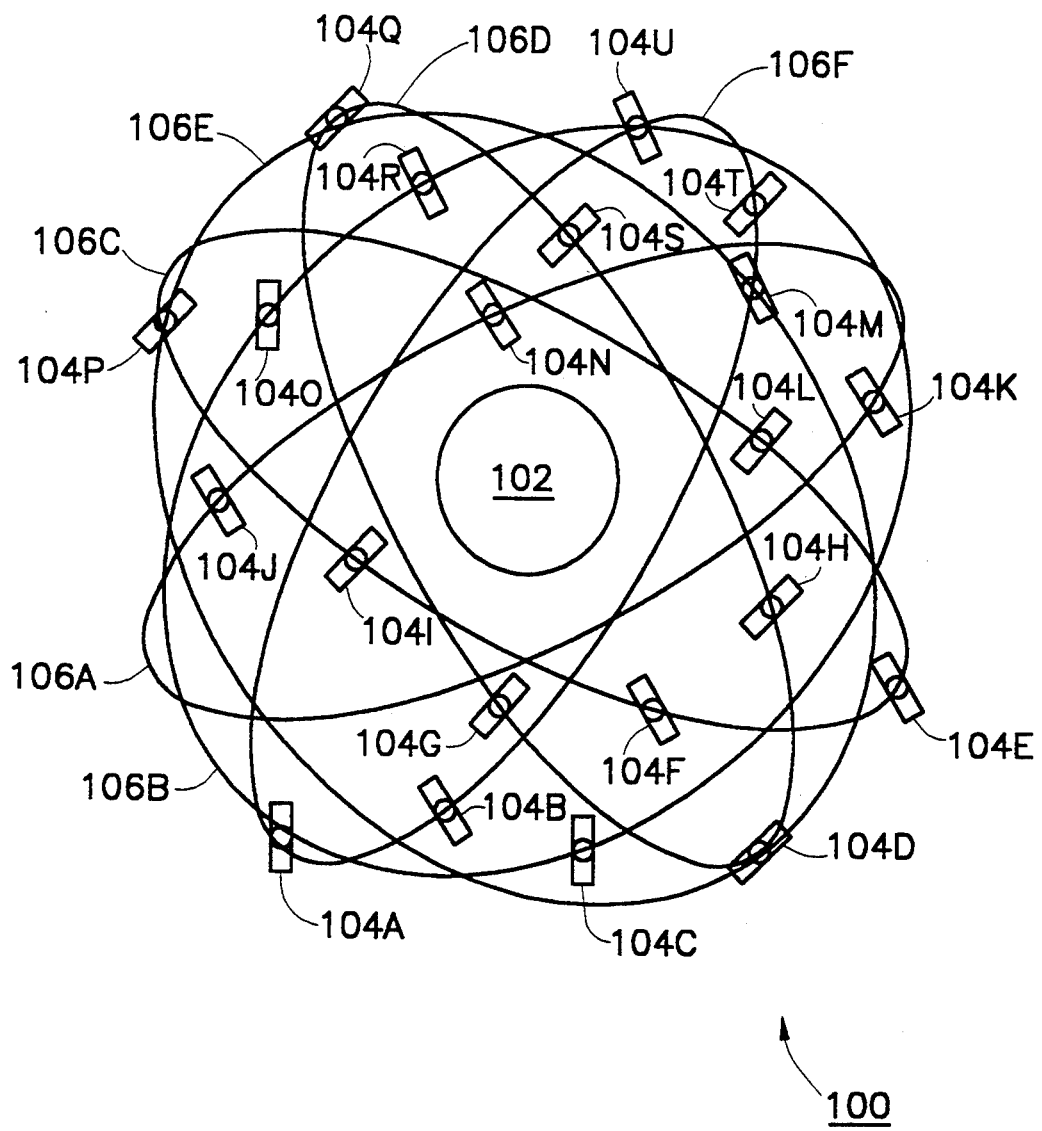
FIG. 1 is a graphical representation of a Global Positioning System (GPS) with twenty-one satellites in six orbits.

With reference to FIG. 1, the present invention is adapted to receive electromagnetic signals from the U.S. government's NAVSTAR Global Positioning System (GPS) satellites. The GPS 100, as shown, will consist of twenty-one satellites 104A–104U in six mutually orthogonal orbits 106A–106F about the Earth 102. The GPS 100 will also include three alternate satellites (not shown). However, the present invention is adaptable to work with other global positioning systems and is therefore not constrained to any one such system.

Figure 2:
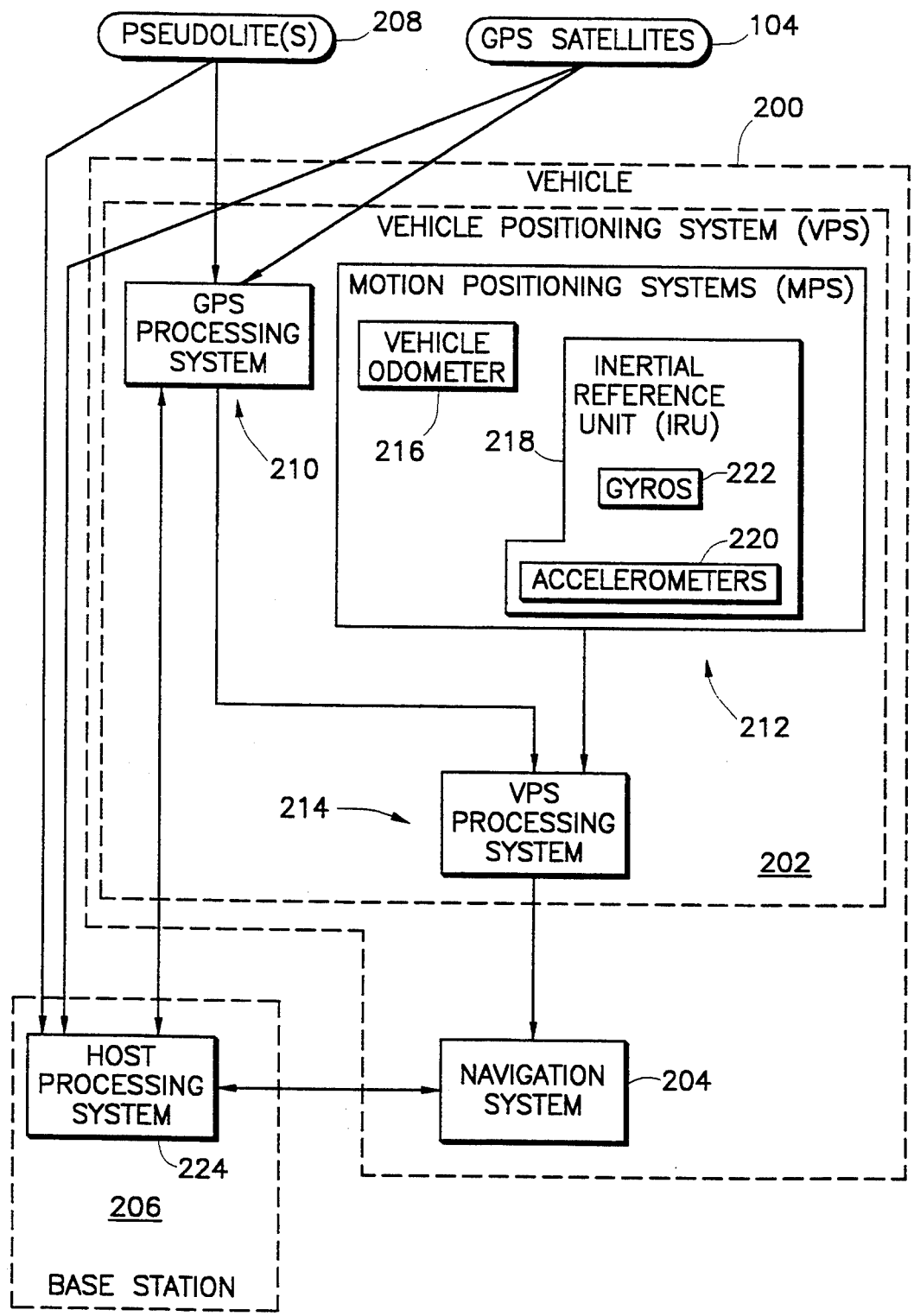
FIG. 2 is a block diagram of a terrestrial positioning system or vehicle positioning system (VPS) including a GPS processing system, a motion positioning system (MPS) and a VPS processing system, according to an embodiment of the present invention.

With reference to FIG. 2, the present invention or position determining system or vehicle position system (VPS) 202 is adapted to work with a navigation system 204. The navigation system 204 receives position information from the position determining system 202 and navigates a vehicle 200 by controlling its movements along a given path. In the preferred embodiment, the navigation system 204 is situated on board the vehicle 200. The navigation system 204 guides the vehicle 200 along pre-established or dynamically generated paths by generating models or conceptual representations of the path. For example, lines and arcs may be used to establish vehicle paths between objective points. Furthermore, mathematical B-splines or clothoid curves may be used to model the actual path the vehicle 200 is to navigate.

The VPS 202 receives signals from the GPS satellites 104. Additionally, one or more pseudolites 208 may be used. Pseudolites are defined as systems on or near the Earth's surface for emulating GPS satellites. Pseudolites are typically used in terrain where not enough satellites are visible. In the preferred embodiment, a base station 206 is provided. The base station 206 receives signals from the satellites 104 and pseudolites 208. The base station 206 preferably includes a host processing system 224. The host processing system 224 performs functions for both the position determining system 202 and the navigation system 204.

With respect to the position determining system 202, the host processing system 224 receives GPS data and/or data from pseudolite(s) and serves as a known reference point to help improve the accuracy of vehicle position estimates (see below). The host processing system 224 improves the accuracy of position estimates by determining biases or errors in the received data.

The biases are then transmitted to the position determining system 202 aboard the vehicle 200. These biases are used to help eliminate the errors in the position estimates caused by the errors in the electromagnetic signals from the satellite.

The host processing system 224 further provides functions relating to the navigation system 204. The host processing system 224 handles scheduling and dispatching of the vehicle 200 with much the same results as a human dispatcher. Consequently, the host processing system 224 can thereby determine the work cycle of the vehicle 200.

The host processing system 224 further includes a GPS processing system. The GPS processing system of the host processing system 224 provides GPS data and position estimates to be used in calculating spatial biases. The purposes of the host processing system 224 at the base station 206 are to (1) monitor the operation of the vehicle 200, (2) provide a known terrestrial reference point from which spatial biases can be produced, and (3) provide additional information to the vehicle 200 as required over a high-speed data communication channel.

In the preferred embodiment, the base station 206 will be located close to the vehicle 200, preferably within 20 miles. The close geographical relationship will provide for effective radio communication between the base station 206 and the vehicle 200 over the communication channel. It will also provide an accurate reference point for comparing satellite transmissions received by the vehicle 200 with those received by the base station 206.

A geographically proximate reference point is needed in order to compute accurate spatial biases. Spatial and clock biases are, in effect, the common mode noise that exists inherently in the NAVSTAR GPS and the GPS processing system 210. Once computed at the base station 206, the spatial biases are then sent to the vehicle 200.

In one embodiment, spatial biases are determined by first modeling the orbit of a satellite as a parabola using best fit methods. Using the parabolic models, locus points or an expected position of the satellites are determined. The distance between the locus points and the known location of the base station 206, can be determined and are referred to as "expected pseudoranges". The spatial biases are the differences between the actual pseudoranges and the "expected pseudoranges".

In another embodiment, spatial biases may be determined by comparing the known location of a reference point with its estimated position. For example, using GPS data, the GPS processing system at a base station 206 estimates the position of the base station 206. This estimate is compared with the known location and the difference is transmitted to the vehicle 200 to be incorporated into future vehicle position estimates.

In the preferred embodiment of the present invention, the host processing system 224 at the base station 206 further coordinates the autonomous activities of the vehicle 200 and interfaces the position determining system 202 with human supervisors.

The position determining apparatus 202 includes a means or GPS processing system 210. The GPS processing system 210 receives electromagnetic signals from a plurality of GPS satellites 104 and/or pseudolites 208 and responsively produces a first position estimate.

Figure 3:
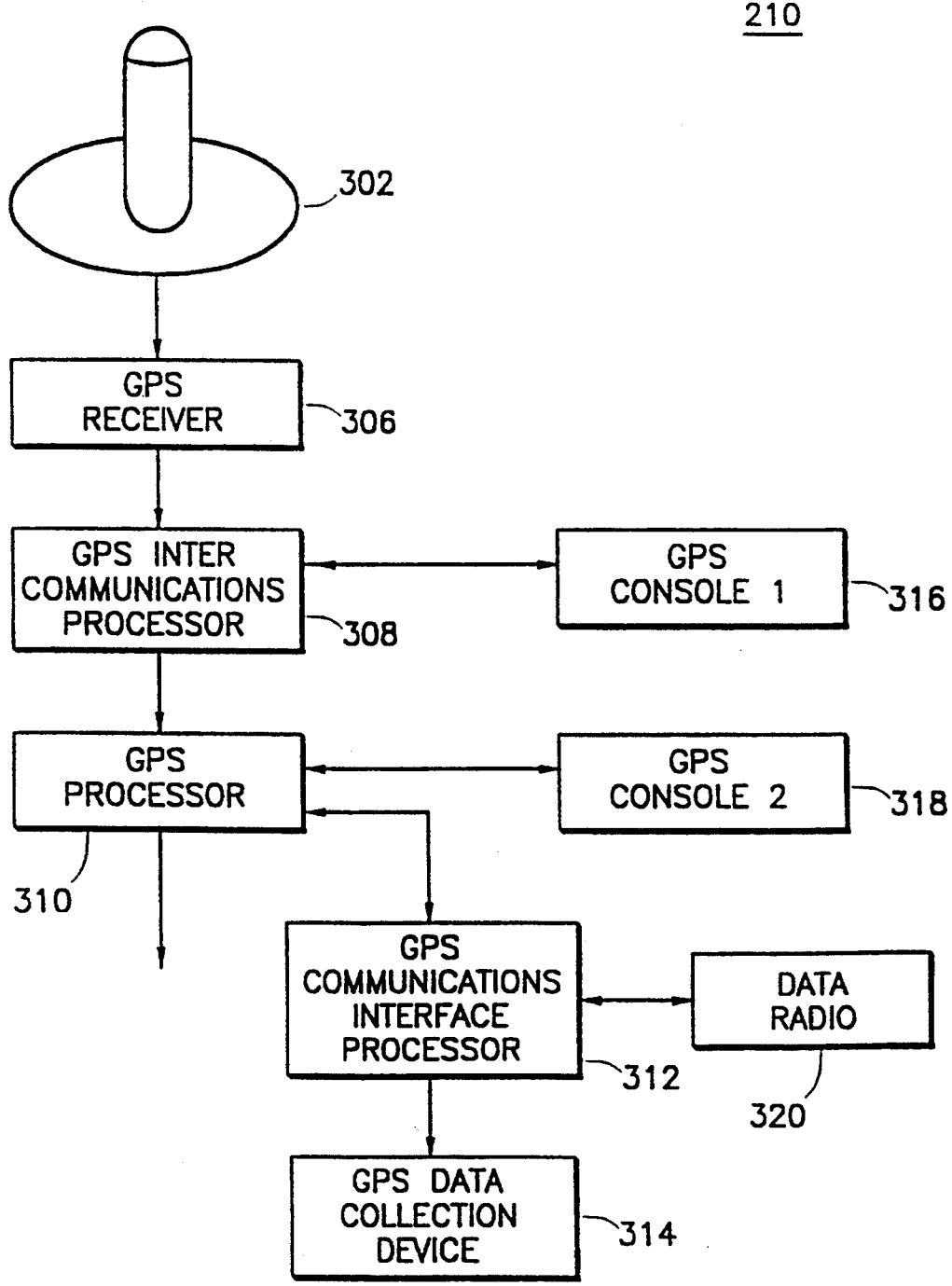
FIG. 3 is a block diagram of the GPS processing system of FIG. 2 including a GPS inter communications processor and a GPS processor, according to an embodiment of the present invention.

With reference to FIG. 3, one embodiment of the hardware configuration of the GPS processing system 210, is described. The GPS processing system 210 on board the vehicle includes a GPS antenna 302. In the preferred embodiment, the GPS antenna 302 is receptive to the radio spectrum of electromagnetic radiation. However, the present invention contemplates reception of any signal by which GPS satellites might encode data. A suitable antenna is availably from Chu Associates Inc. of Littleton, Mass., as Model No. CA3224.

The GPS antenna 302 is coupled to a GPS receiver 306. The term "couple" means any system or method for establishing communication. Coupling systems or methods may include, for example, electronics, optics, and/or sound techniques as well as any others not expressly described herein.

In the preferred embodiment, the GPS receiver 306 processes the GPS data transmitted by the GPS satellites 104 and/or pseudolites 208. The GPS receiver 306 computes pseudoranges (ranges) for each of the GPS satellites for which data is received. These satellites are said to be in "view" of the GPS receiver 306. Pseudorange refers to an estimate of the distance between the GPS receiver 306 and a selected satellite as a function of the time delay between the time of transmission and time of reception of the electromagnetic signal from the satellite. In the preferred embodiment, the GPS receiver 306 processes all of the actual pseudoranges in parallel. Suitable receivers are available from Magnavox Advanced Products and Systems Co. of Torrance, Calif. as Model Nos. MX 4200, MX 4818, and MX 7120.

A GPS intercommunications processor 308 couples the GPS receiver 306 to a GPS processor 310 and a first GPS console 316. In the preferred embodiment, the GPS intercommunications processor 308 includes a microprocessor. A suitable microprocessor is available form Motorola Inc. of Schaumburg, Ill. as Model No. MC68000. The GPS intercommunications processor 308 coordinates data exchange between the GPS receiver 306, the GPS processor 310, and the first GPS console 316. Specifically, the GPS intercommunications processor 308 receives pseudorange data from the GPS receiver 306 and relays the pseudorange data to the GPS processor 310. In the preferred embodiment, the pseudorange data includes the actual pseudoranges computed by the GPS receiver 306, the number of satellites being currently viewed by the receiver 306, and other GPS data needed by the GPS processor 310. The GPS intercommunications processor 308 also relays status information regarding the GPS receiver 306 and GPS processor 310 to the first GPS console 316.

The GPS processor 310 uses a number of algorithms and methods to process the data it receives from the GPS receiver 306. The functions performed by the GPS processor 310 are discussed below in relation to FIGS. 4 and 8–12. In the preferred embodiment, the GPS processor 310 includes a microprocessor. A suitable microprocessor is available from Motorola as part no MC68020.

The GPS processor 310 is coupled to a second GPS console 318 and a GPS communications interface processor 312. The second GPS console 318 provides the user interface from which the GPS processor 310 can be activated and monitored. The GPS console 318 is well known in the art and many types of devices are commercially available which provide the desired console function. One suitable device is available from Digital Equipment Corporation of Maynard, Mass., as model no. VT220.

The GPS communications interface processor 312 is essentially an input/output (I/O) board. It is coupled to a data radio 320 and a GPS data collection device 314. The GPS communications interface processor 312 coordinates data exchange between the GPS processor 310 and both the data radio 320 and the GPS data collection device 314. One suitable communications interface processor is available from Motorola Inc., as model no. MVME331.

The data radio 320 establishes a communication link between the GPS processor 310 at the vehicle 200 to a similar data radio located at the base station 206. In the preferred embodiment, the data radio 320 communicates synchronously at a baud rate of 9600 using RF frequencies. The data radio at the base station 206 provides periodic updates on the amount of spatial bias for each satellite to the data radio 320 on the vehicle 200 at a rate of 2 Hz (twice a second).

The GPS data collection device 314 can be any of numerous common electronic processing and storage devices such as a desktop or portable computer.

Figure 4:
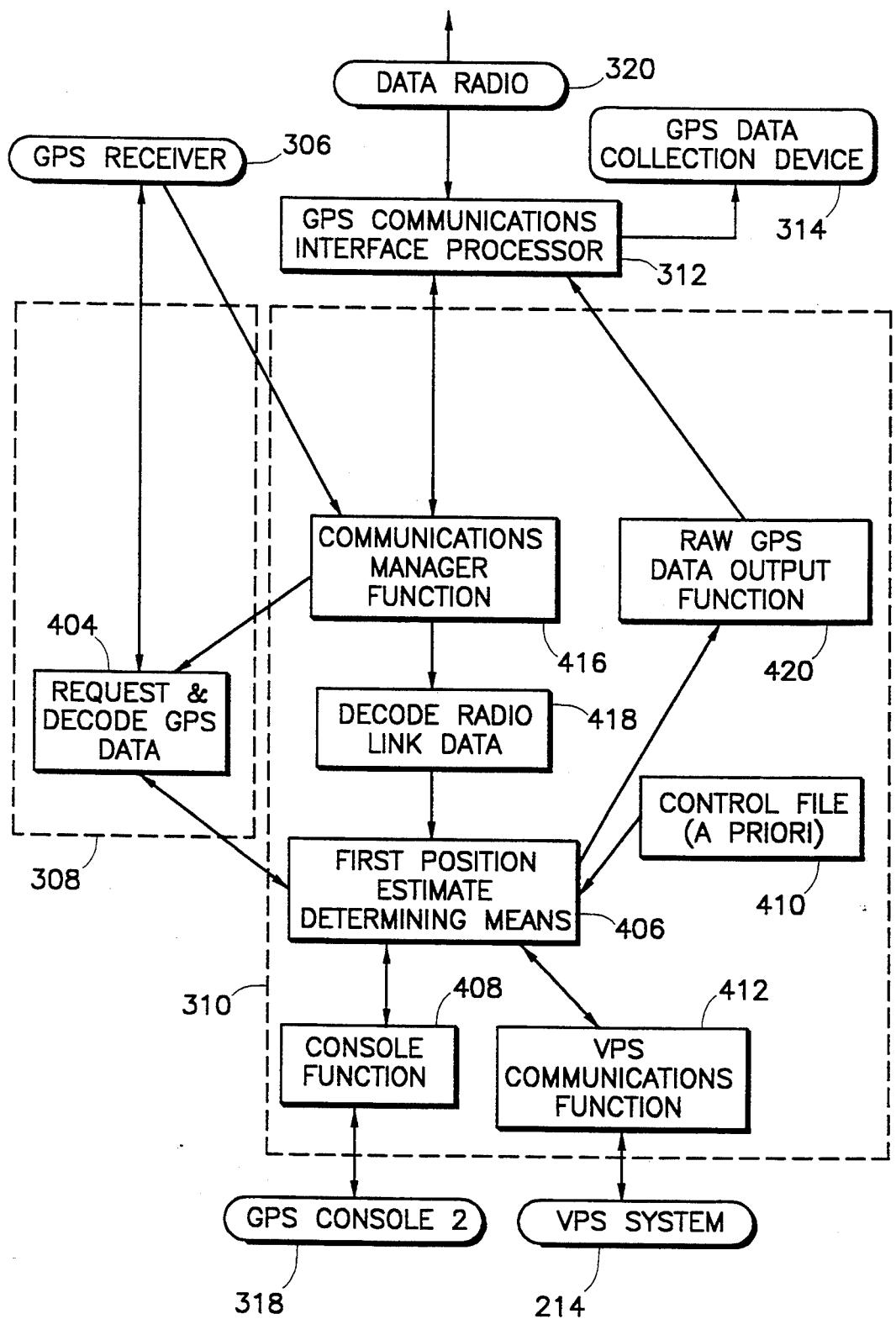
FIG. 4 is a functional block diagram of the GPS inter communications processor and the GPS processor of FIG. 3 including a first position estimate determining means, according to an embodiment of the present invention.

With reference to FIG. 4, the GPS inter communications processor 308 implements a request and decode GPS data function 404. As shown, the data transmitted from the GPS receiver 306 enters request and decode GPS data function 404 and is relayed to the GPS processor 310.

The GPS Processor 310 implements a means 406 for determining a first position estimate. A console function 408 controls data exchange between the first position estimate determining means 406 and the second GPS console 318. A VPS communications function 412 responsively controls data exchange between the first position estimate determining means 406 and the VPS system 214.

A control file 410 contains a priori saved file and describes how the GPS data is to be utilized by the first position estimate determining means 406. In the preferred embodiment, the control file 410 describes the noise threshold, the speed of the response, the initial states of vehicle position and velocity, the extent of deviation before a reset of the first position estimate determining means 406 occurs, the number of bad measurements allowed, and/or the time allotted between measurements.

A communications manager function 416 controls the request and decode function 404 of the GPS inter communications processor 308 and relays data to the first position estimate determining means 406 through a decode radio link data function 418. The communications manager function 416 further controls the flow of data from the data radio 320 to the first position estimate determining means 406. Data from the first position estimate determining means 406 to the data radio 320 flows to and a raw GPS data output function 420.

Referring again to FIG. 2, the VPS 202 includes a means 212 for producing a second position estimate and a means 214 for receiving the first and second position estimates and responsively producing a third position estimate. The second and third position estimate producing means 212,214 are hereinafter referred to as the motion positioning system (MPS) and the VPS Processing System, respectively. Usually, the second position estimate is combined with the first position estimate and filtered to form a more accurate third position estimate. However, it is envisioned that in some instances the second position estimate may be utilized exclusively when the first position estimate is deemed to be drastically inaccurate.

In the preferred embodiment, the MPS 212 includes an odometer 216 and an inertial reference unit (IRU) 218. However, the IRU 218 could be utilized without the odometer 216. The IRU 218 includes ring-laser gyros 222 and 220 accelerometers of known design. In the preferred embodiment, the IRU 218 is a replica of the system used by Boeing 767 aircrafts, but has been modified to account for the lesser dynamics of the vehicle 200 relative to the 767 aircraft.

The IRU 218 is adapted to output vehicle position at 5 Hz, velocity at 10 Hz, and roll, pitch and yaw at 50 Hz. Furthermore, the odometer 216 is adapted to output the distance traveled by the vehicle 200 at 20 Hz.

The laser gyroscopes of the IRU 218, must at first be given an estimate of the latitude, longitude and altitude of the vehicle 200. Using this data as a baseline position estimate, the gyroscopes 222 then use a predefined calibration in conjunction with forces associated with the rotation of the Earth 102 to determine as estimate of the vehicle's 200 current position.

This information is then combined by the IRU 218 with data acquired by the accelerometers 220 to produce a more accurate, second position estimate of the vehicle's current position.

Figure 5:
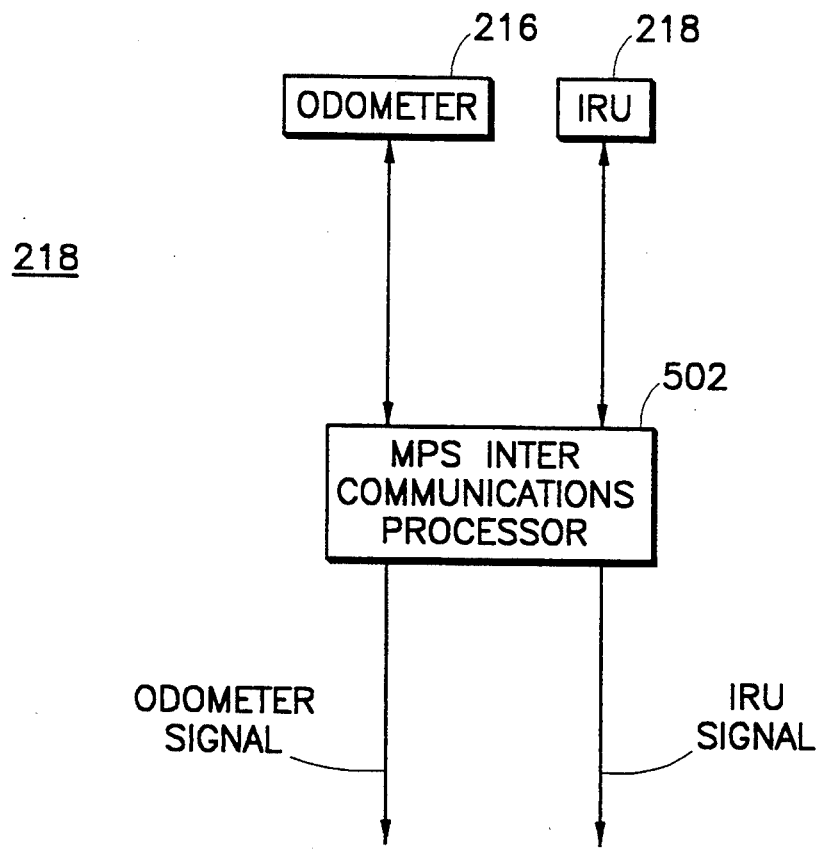
FIG. 5 is a block diagram of the motion processing system of FIG. 2, according to an embodiment of the present invention.

With reference to FIG. 5, the MPS 218 includes an MPS inter communications processor 502. The odometer 216 and the IRU 218 are coupled to the VPS 214 by the MPS inter communications processor 502. The second position estimate and the data from the odometer 216 are transmitted to the VPS 214 by the MPS intercommunications processor 502. In the preferred embodiment, the MPS inter communications processor 502 includes a microprocessor. One suitable microprocessor is available from Motorola, Inc as part no. MC68000. The MPS inter communications processor 502 coordinates data exchange between the MPS 218 and the VPS 214.

Figure 7:
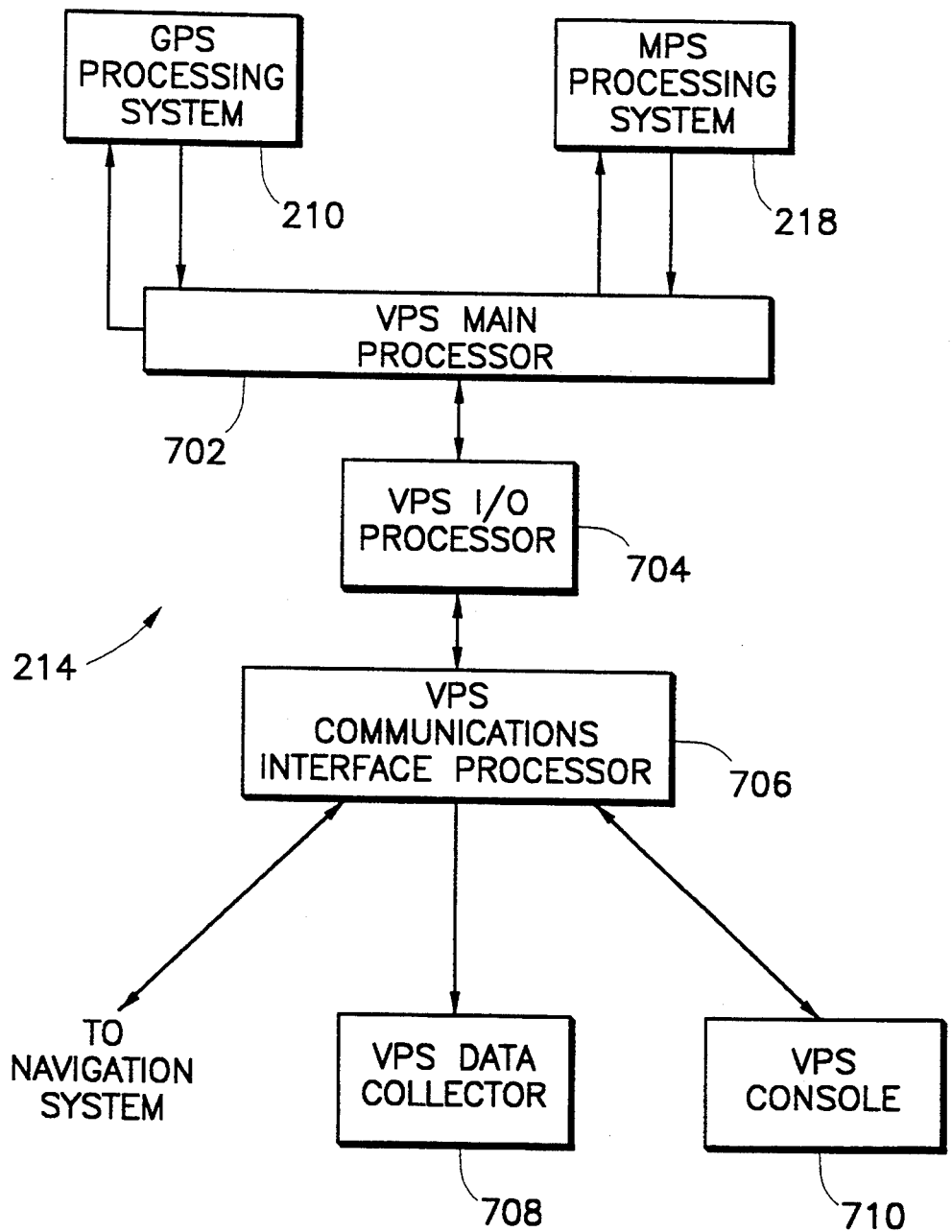
FIG. 7 is a block diagram of the VPS of FIG. 2, according to an embodiment of the present invention.

With reference to FIG. 7, the preferred embodiment of the architecture of the VPS processing system 214 is depicted. The GPS processing system 210 and MPS 218 are independently coupled to the VPS main processor 702. Because they are independent, the failure of one of the systems will not cause the other to become inoperative. Thus, if the GPS processing system 210 is not operative, data can still be collected and processed by the MPS 218 and, consequently, the VPS 214. The GPS processing system 210 and the MPS 218 transmit signals to the VPS main processor 702, as shown. These signals contain position, velocity, time, pitch, roll, yaw, and distance data.

The VPS main processor 702 is coupled to a VPS I/O processor 704. The VPS main processor 702 transmits the third position estimate to the VPS I/O processor 704, as shown. The third position estimate is derived from the GPS, IRU, and odometer data noted above, and more specifically, the first and second position estimates of the vehicle 200.

The present invention contemplates any system and method by which the signals can be received by the VPS main processor 702 from the GPS processing system 210 and MPS system 218 and forwarded to the VPS main processor 702. In the preferred embodiment, the VPS main processor 702 includes a microprocessor. One suitable microprocessor is commercially available from Motorola Inc. as part no. MC68020.

Figure 6:
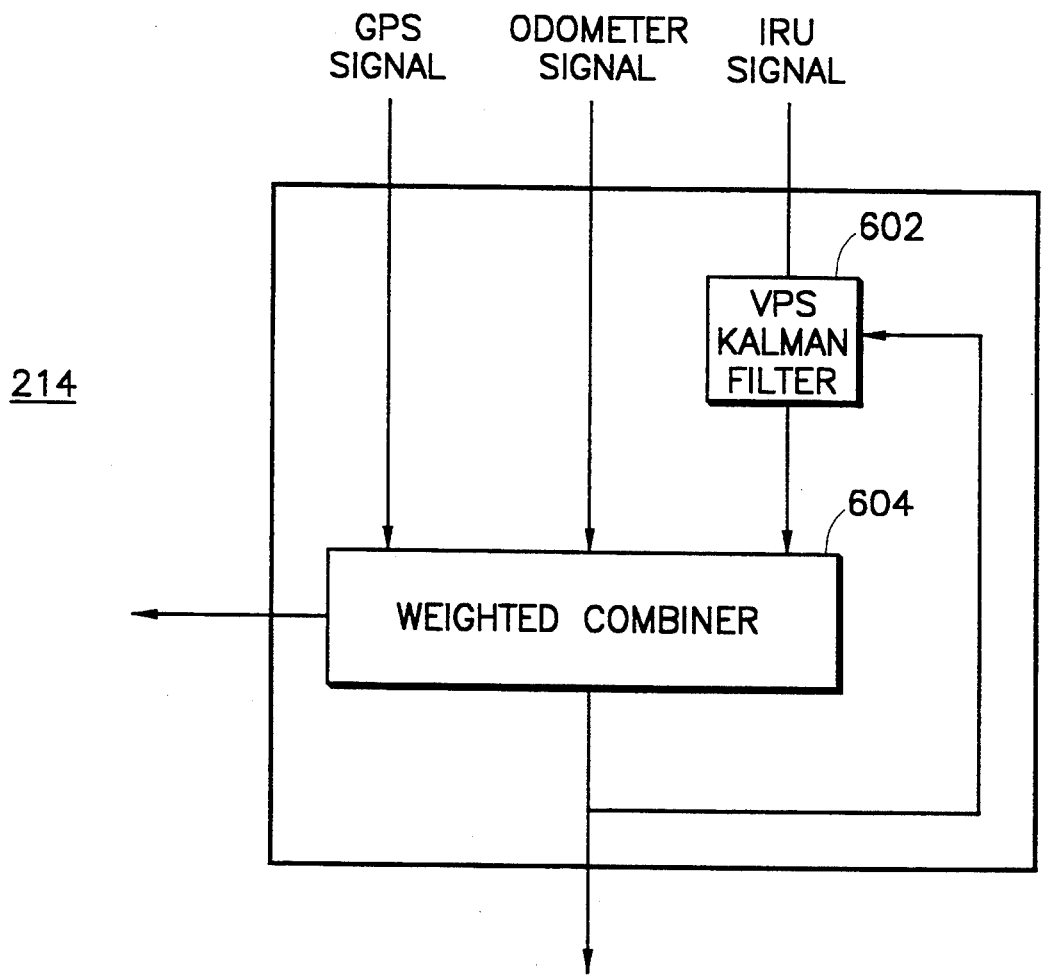
FIG. 6 is a functional block diagram of the VPS of FIG. 2, according to an embodiment of the present invention.

With reference to FIG. 6, the VPS main processor 702 implements a VPS Kalman filter 602 and a weighted combiner 604. As shown, the GPS signal and the odometer signal are transmitted directly to the weighted combiner 604. The IRU signal is transmitted into the VPS Kalman filter 602. In the preferred embodiment, the GPS signal is transmitted at a rate of 2 Hz. The odometer signal is transmitted at a rate of 20 Hz. Moreover, the IRU signal, which includes the second position estimate, is transmitted at a rate of 50 Hz.

The VPS Kalman filter 602 processes the IRU signal, filters extraneous noise from the data, and outputs the processed data to the weighted combiner 1204. Further, the VPS Kalman filter 602 receives a signal from the weighted combiner 604, which is used to reset the VPS Kalman filter 602 with new position information.

The weighted combiner 604 processes the signals and gives a predetermined weighing factor to each data based on the estimated accuracy of data gathering technique used. Thus, in the preferred embodiment, the first position estimate is weighted heavier than the second position estimate of the IRU signal. The reason for this weighing scheme is that the first position estimate is inherently more accurate than the second position estimate from the IRU.

However, velocity can be more accurately determined by the IRU 222. Therefore, the velocity component of the IRU signal can be weighted heavier than the velocity component of the GPS signal. In the preferred embodiment of the present invention, the velocity component of the IRU signal is used exclusive of the velocity component of the GPS signal.

The weighted combiner 604 produces an output at 20 Hz. The output contains all computed data and is sent to two locations: the VPS Kalman filter 602 and the VPS I/O processor 704. The output contains time information relative to the GPS satellites. The output further contains information relative to vehicle position, velocity, yaw, pitch, and roll. Finally, note that the VPS output comprises the third position estimate of the vehicle 200.

Another output from the weighted combiner 604 contains only velocity data pertaining to the vehicle 200. This velocity data is sent to the GPS processing system 210 from the VPS main processor 702. The velocity data is used to increase the accuracy of first position estimates.

Referring back to FIG. 7, the VPS I/O processor 704 is coupled to a VPS communications interface processor 706. In the preferred embodiment, the communications interface processor 706 is the MVME331 processor, which is commercially available from Motorola Inc. Any processor accomplishing the same purpose as described below may be utilized.

In the preferred embodiment, the VPS communications interface processor 706 is coupled to three different devices: (1) a VPS console 710, (2) a data collection device 708, and (3) the navigation system 204. The VPS communications interface processor 706 routes the data, including the third position estimate, to the above three devices at a rate of 20 Hz.

The VPS console 710 is well known in the art, and is commercially available from Digital Equipment Corporation, of Minneapolis, Minn., Model Number VT220. This VPS console 710 is used to display the current status of the VPS I/O processor 704.

The VPS data collection device 708 can be any of numerous commercially available electronic processing and storage devices, for example, a desktop or portable computer.

Figure 8:
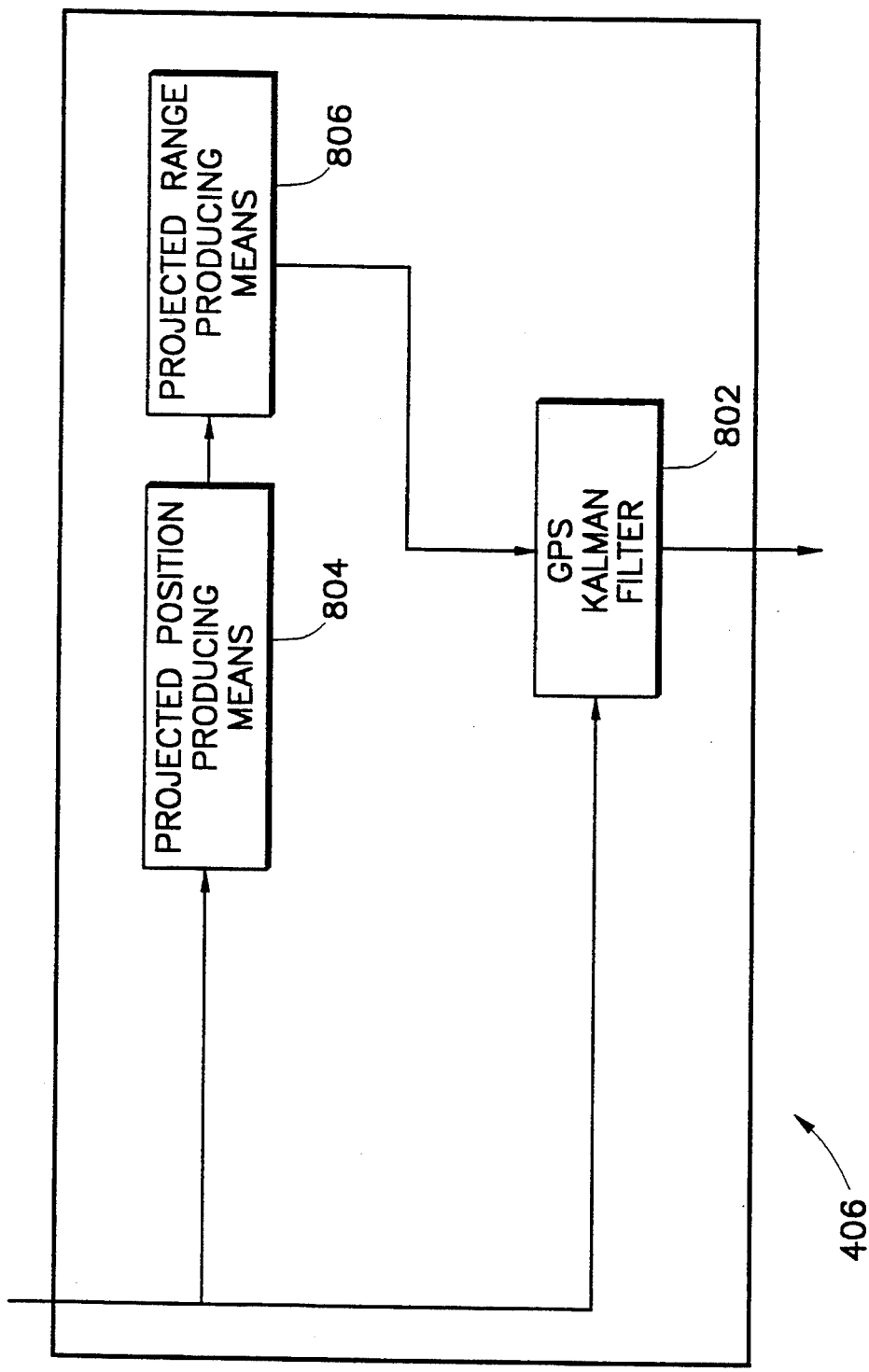
FIG. 8 is a functional block diagram of the first position estimate determining means of FIG. 4, according to an embodiment of the present invention.

With reference to FIGS. 8–12, the present invention is adapted to improve the accuracy of the first position estimate, and thereby the accuracy of the vehicle's location or third position estimate. As shown in FIG. 8, the first position estimate producing means 406 includes a Kalman filter 802.

In part, the function of the Kalman filter 802 is to filter out noise associated with the pseudorange data. The noise may include, for example, ionospheric, clock, and/or receiver noise. The GPS Kalman filter 802 of the host processing system 224 at the base station 208 computes spatial biases which are transmitted to the vehicle 200 for increasing the accuracy of first position estimates. In contrast, the GPS Kalman filter 802 in the vehicle 200 takes into consideration the spatial biases which are received from the base station 206.

The GPS Kalman filter 802 functions in a semi-adaptive manner. In other words, the GPS Kalman filter 802 automatically modifies its threshold of acceptable data perturbations, depending on the velocity of the vehicle 200. The term "perturbation" in the context of this document refers to a deviation from a regular course. The semi-adaptive functioning of the GPS Kalman filter 802 optimizes the response and the accuracy of the present invention.

Generally, when the vehicle 102 increases its velocity by a specified amount, the GPS Kalman filter 802 will raise its acceptable noise threshold. Similarly, when the vehicle 102 decreases its velocity by a specified amount the GPS Kalman filter 802 will lower its acceptable noise threshold. This automatic optimization technique of the present invention provides the highest degree of accuracy under both moving and stationery conditions.

In the best mode of the present invention, the threshold of the GPS Kalman filter 802 does not vary continuously or in very minute discreet intervals. Rather, the intervals are larger discreet intervals and, therefore, less accurate than a continuously varying filter. However, the Kalman filter 802 of the present invention is easy to implement, less costly, and requires less computation time than with a continuously varying filter. However, it should be noted that using a continuously varying filter is possible and is intended to be included herein.

In operation, the GPS Kalman filter 802 must be given an initial value at system start-up. From the initial value and GPS data collected by the GPS receiver 306, the GPS Kalman filter 802 extrapolates a current state (which includes the first position estimate and the vehicle velocity for northing, easting and altitude). The GPS Kalman filter 802 operates in a cyclical manner. In other words, the extrapolated current state is assumed to be the initial value for the next iteration. It is combined/filtered with new GPS data (an update) to derive a new current state.

In normal operation, the first position estimate determining means 406 calculates the first position estimate using the received GPS data. The GPS data includes signals from at least four satellites. From the received signals, the vehicle position determining means 202 calculates actual pseudoranges. Using triangulation techniques, the position of the vehicle 200 can be estimated using the calculated actual pseudoranges. The present invention includes apparatus and method for increasing the accuracy of the position determination by projecting at least one satellite 180° about the center of the Earth.

Figure 9:
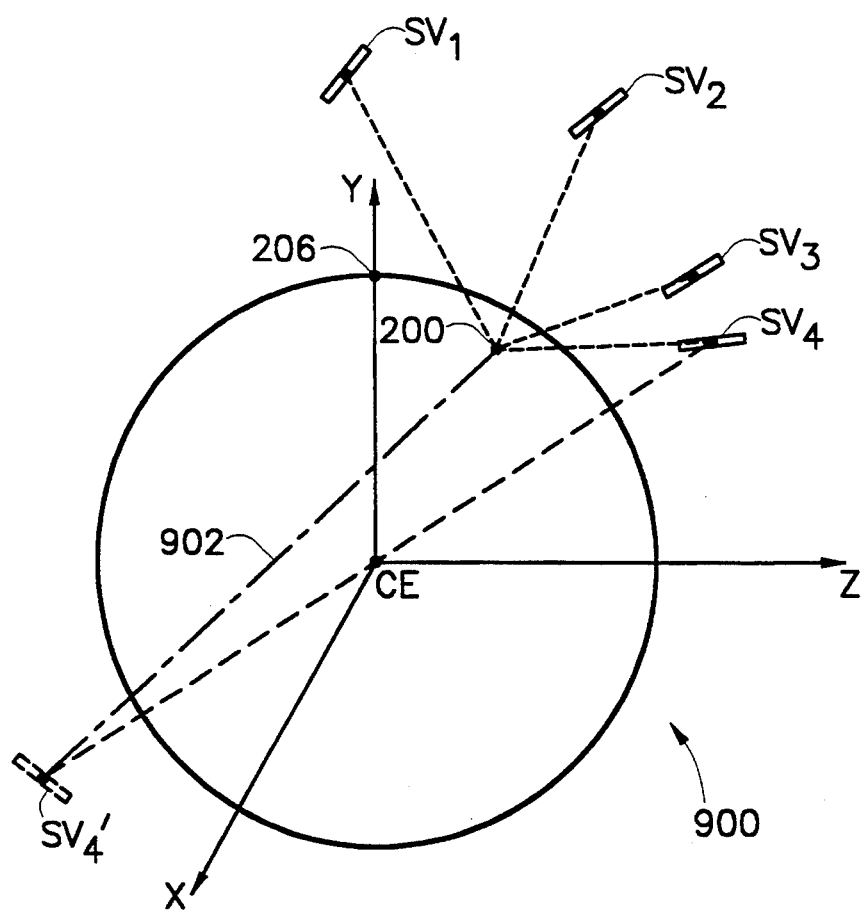
FIG. 9 is a graphical representation of the projection of a satellite, according to an embodiment of the present invention.

For example, with reference to FIG. 9, during normal operation, the GPS receiver 306 on the vehicle 200 receives GPS data from four satellites, $SV_1$, $SV_2$, $SV_3$, and $SV_4$. The vehicle's Cartesian coordinates with respect to the center of the Earth, CE, are determined using triangulation techniques. The vehicle's X, Y, and Z coordinates are determined by solving the equations:

$$(X_1-U_x)^2+(Y_1-U_y)^2+(Z_1-U_z)^2=(R_1-C_b)^2 \quad \text{EQU. 1}$$

$$(X_2-U_x)^2+(Y_2-U_y)^2+(Z_2-U_z)^2=(R_2-C_b)^2 \quad \text{EQU. 2}$$

$$(X_3-U_x)^2+(Y_3-U_y)^2+(Z^3-U_z)^2=(R_3-C_b)^2 \quad \text{EQU. 3}$$

$$(X_4-U_x)^2+(Y_4-U_y)^2+(Z_4-U_z)^2=(R_4-C_b)^2 \quad \text{EQU. 4}$$

where, $X_n$, $Y_n$, $Z_n$ are the Cartesian coordinates of the respective satellite designated by n, $R_n$ is the respective actual pseudorange, $C_b$ is the clock bias, and $U_x$, $U_y$, and $U_z$ are the estimated coordinates of the vehicle 200.

The vehicle's latitude and longitude are approximately determined by:

$$U_{lat} = \cos^{-1}\left(\frac{[U_x^2 + U_y^2]^{\frac{1}{2}}}{|U|}\right) \quad \text{EQU. 5}$$

$$U_{long} = \tan^{-1}(U_y/U_x) \quad \text{EQU. 6}$$

$$\text{where, } |U| = [U_x^2 + U_y^2 + U_z^2]^{\frac{1}{2}} \quad \text{EQU. 7}$$

Preferably, vehicle position is determined in the manner above. However, as stated above, the accuracy of the first position estimate is dependent upon the spatial relationship between the satellites. The general rule is that the farther apart the satellites in the constellation are, the more accurate the position determination. Referring to FIG. 9, if for example, satellites $SV_3$ and $SV_4$ are close together, then the first position estimate will be inaccurately biased.

Therefore, in order to correct for this bias or to ensure the most accurate first position estimate, the first position estimate producing means 406 includes means 804 for projecting the position of at least one satellite 180° about the center of the Earth, as shown in FIG. 9. A Cartesian coordinate system 900 is used which includes a plane defined by at least one known reference point, for example a base station 206, and the center of the Earth. With reference to FIG. 9 for example, the plane YZ includes the center of the Earth, CE, and the known position of the base station 206. The X and Z axes are at right angles to the Y axis and to each other.

The Cartesian coordinates of the projected position, $SV_4'$, are designated $X_4'$, $Y_4'$, and $Z_4'$. The projected position is determined by:

$$X_4' = -X_4 \quad \text{EQU. 8}$$

$$Y_4' = -Y_4 \quad \text{EQU. 9}$$

$$Z_4' = -Z_4 \quad \text{EQU. 10}$$

The projected position of $SV_4'$ is used instead of the original or actual position of the satellite in order to estimate the vehicle's position.

Figure 10:
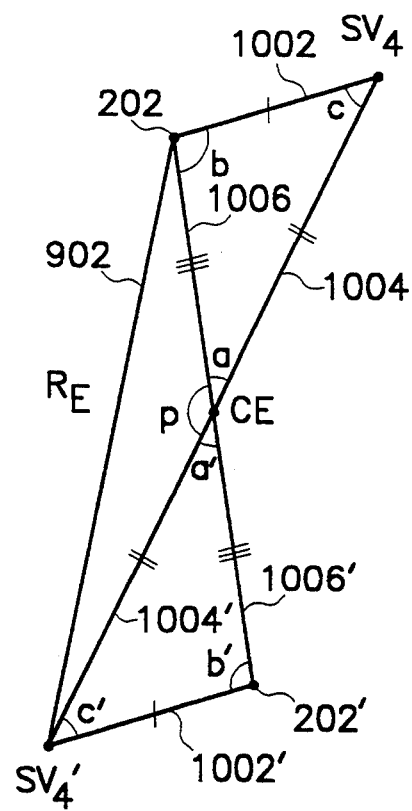
FIG. 10 is a geometric representation of the projection of a satellite, according to an embodiment of the present invention.

A means 806 uses the projected position and responsively determines an effective or projected pseudorange $R_E$ (as shown by the dashed line 902). With reference to FIG. 10, the effective pseudorange is determined geometrically. FIG. 10 illustrates the relative positions of the center of the Earth (CE), the vehicle 202, the fourth satellite, $SV_4$, and the projected position of the fourth satellite, $SV_4'$. Each of the elements shown are in a plane defined by the center of the Earth (CE), the vehicle 202, and the fourth satellite, $SV_4$. The calculated pseudorange between the fourth satellite $SV_4$ and the vehicle 200 is denoted by the line 1002. The distance between the fourth satellite and the CE of the Earth is known and denoted by the line 1004. And the distance between CE and the vehicle 202 is denoted by line 1006. The fourth satellite, $SV_4$, is projected to the other side of the Earth. In order to determine the effective pseudorange, $R_E$ (denoted by 902), the following geometric observation are made:

length of line 1002 = length of line 1002', length of line 1004 = length of line 1004', and length of line 1006 = length of line 1006'.

This is illustrated by the cross marks on the respective lines. Lines with the same number of cross marks have equal lengths. Furthermore, the angles in the illustration have the relationships:

angle a = angle a', angle b = angle b' and angle c = angle c'.

The effective pseudorange, $R_E$, between the vehicle 202 and the projected satellite is equal to the length of line 902. $R_E$ can therefore be derived by geometric identities. In one embodiment, the effective pseudorange, $R_E$, is determined by:

$$R_E = [B^2 + C^2 - 2BC \cos p]^{\frac{1}{2}} \quad \text{EQU. 11}$$

where, $$p = \pi - a \quad \text{EQU. 12}$$

where, $$a = \cos^{-1}\left[\frac{B^2 + C^2 - A^2}{2BC}\right] \quad \text{EQU. 13}$$

where A,B,C are determined from the GPS data and are equal to the length of lines 1002, 1004, and 1006, respectively.

The effective pseudorange, $R_E$, is used to determine the first position estimate. EQU. 4 therefore becomes:

$$(X_4'-U_x)^2+(Y_4'-U_y)^2+(Z_4'-U_z)^2=(R_E-C_b)^2 \quad \text{EQU. 14}$$

Figure 11:
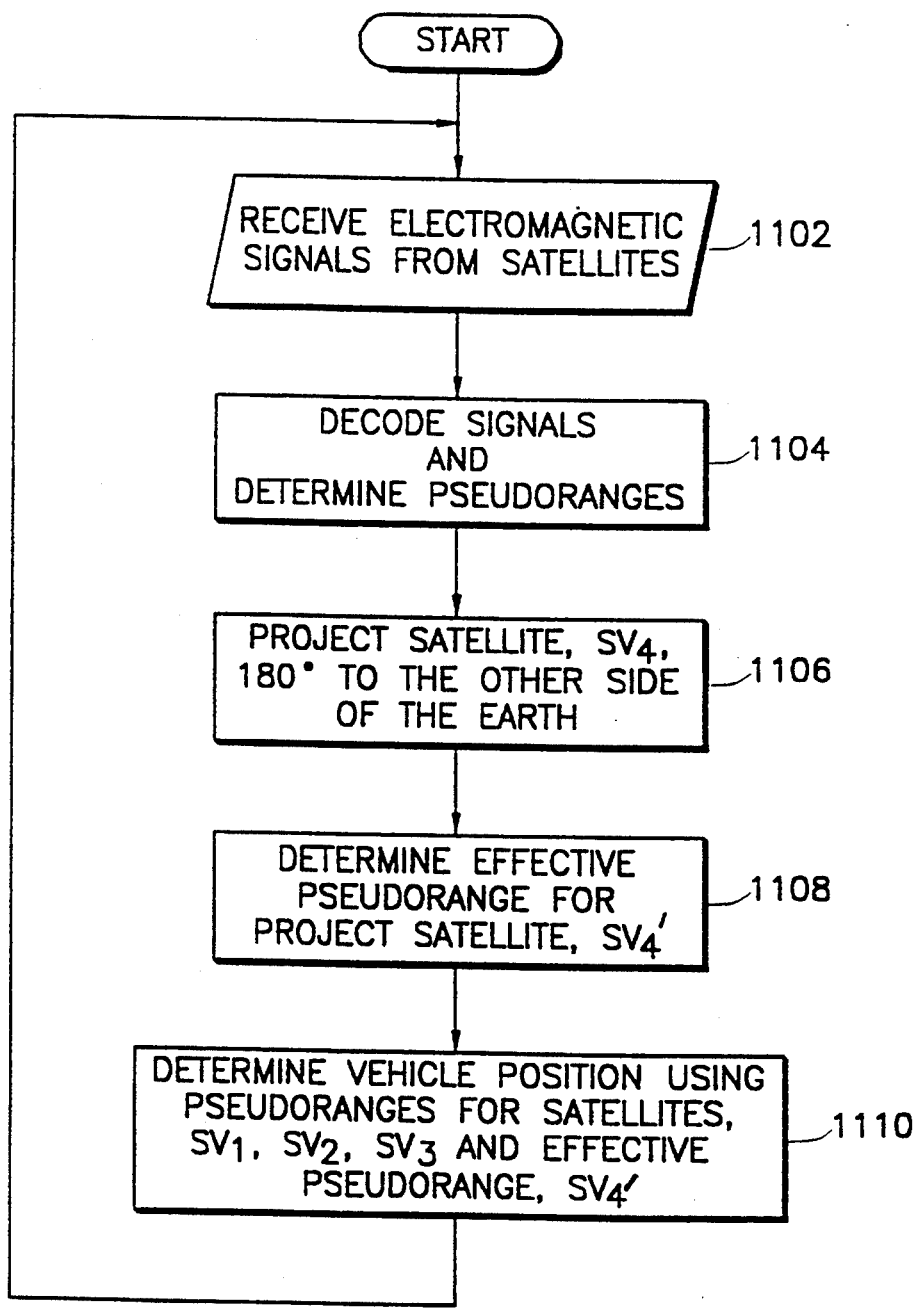
FIG. 11 is a flow diagram of a control scheme for determining the position of a vehicle, according to an embodiment of the present invention; and, FIG. 12 is a flow diagram of a control scheme for determining the position of a vehicle, according to another embodiment of the present invention.

With reference to FIG. 11, a method for estimating the position of a vehicle 200, according to one embodiment of the present invention is described. In a first control block 1102, the electromagnetic signals from a plurality of satellites ($SV_1$-$SV_4$) are received. In a second control block 1104, the received signals are decoded or processed and the actual pseudoranges are determined. The actual pseudoranges are determined from the time differential from when the received signals were transmitted and when they were received. In a third control block 1106, the position of one of the satellites is projected 180° about the center of the Earth (see EQUs. 7-9). In a fourth control block 1108, the effective pseudorange ($R_E$) for the projected satellite is determined (see EQU. 12). In a fifth control block 1110, the calculated effective pseudorange and the actual pseudoranges for the other three satellites are used to determine the vehicle's location.

Figure 12:
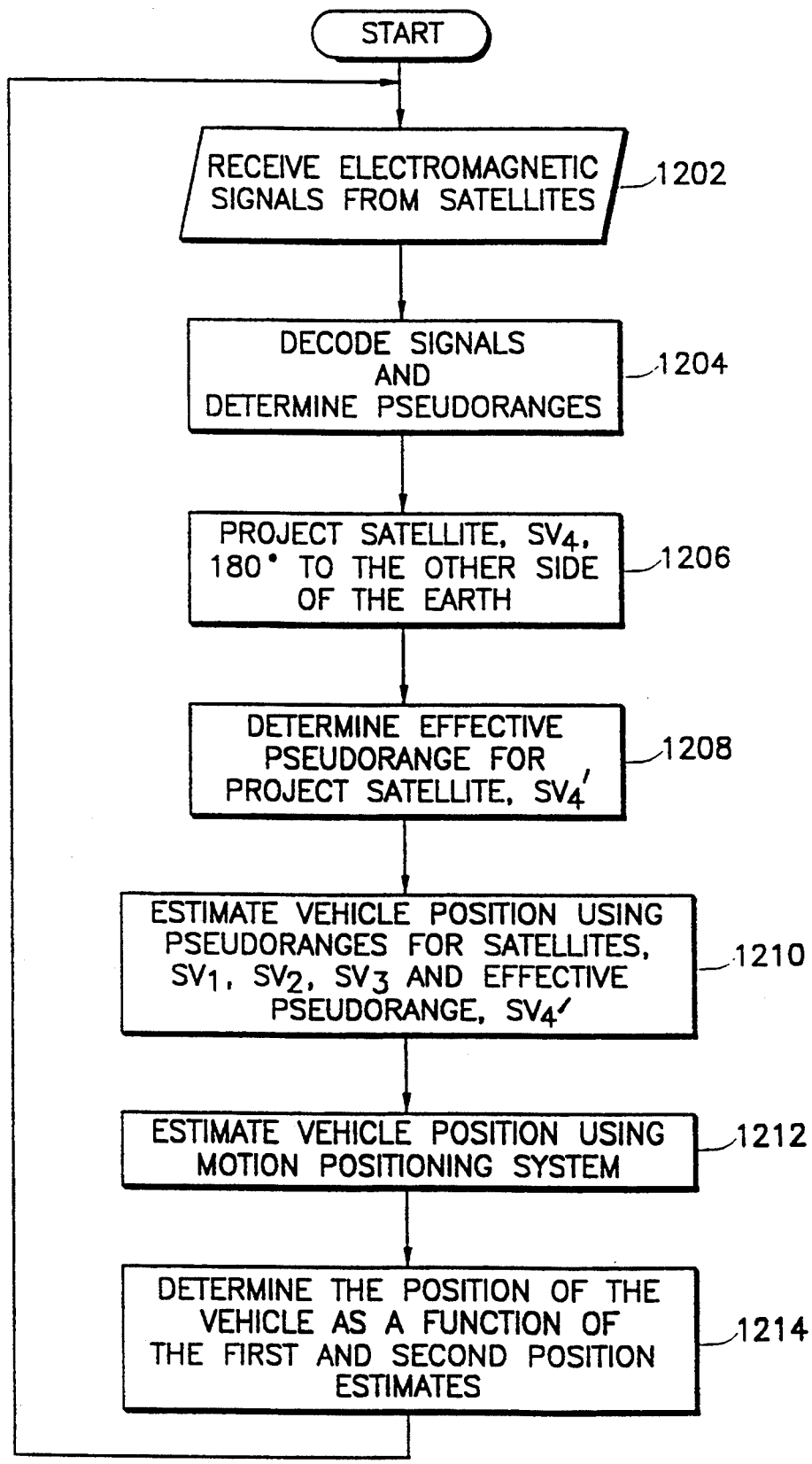

With reference to FIG. 12, a method for estimating the position of a vehicle 200, according to another embodiment of the present invention is described. In a sixth control block 1202, the electromagnetic signals from a plurality of satellites (SV$_1$–SV$_4$) are received. In a seventh control block 1204, the received signals are decoded or processed and the actual pseudoranges are determined. The actual pseudoranges are determined from the time differential from when the received signals were transmitted and when they were received. In a eighth control block 1206, the position of one of the satellites is projected 180 degrees about the center of the Earth (see EQUs. 7-9). In a ninth control block 1208, the effective pseudorange ($R_E$) for the projected satellite is determined (see EQU. 12). In a tenth control block 1210, the calculated effective pseudorange and the actual pseudoranges for the other three satellites are used to determine a first estimate of the vehicle's location. In an eleventh control block 1212, a second estimate of the vehicle's location is determined by the MPS 212. It should be noted that the second position estimate is determined independently from the first position estimate. That is, the second position estimate may be determined before, after or during the preceding steps (control blocks 1202–1210). In a twelfth control block, a third estimate of the vehicle's position is determined as a function of the first and second position estimates.

Industrial Applicability

With reference to the drawings and in operation, the present invention is adapted to increase the accuracy of position estimates based on GPS satellite data. The vehicle position determining system 202 receives electromagnetic signals from all of the GPS satellites that are in view. The electromagnetic signals are decoded by the GPS receiver 306. For best results, signals from at least four satellites is needed. If more than four satellites are available, that is, in view, the vehicle position determining system 202 is adapted to choose the best four satellites to optimize the spatial relationship of the chosen constellation.

Furthermore, the present invention is adapted to increase the number of possible constellations. In other words, by projecting one of the satellites 180 degrees about the center of the Earth, the number of possible constellations can be significantly increased. For example, if five satellites are in view, there are normally four possible constellations. However, by projecting one or more of the satellites 180 degrees, the number of possible constellations increases dramatically. The only limitation is that the satellite has to be in view, that is, the GPS receiver 306 has to receive signals from a particular satellite in order for it to be used. Furthermore, if there are only four satellites available, the accuracy of the position estimate may be increased by projecting one or more of the satellites.

By projecting one or more satellites, a more accurate triangulation is assured. Satellites are chosen based on the optimum or "best" constellation. Using the foregoing systems and method, the "best" constellation may include a combination of "actual" satellites and "projected" satellites. This ensures the best possible "spreading" or spatial relationships between the satellites.

In this manner, the vehicle position determining system 202 is able to selectively project satellites to the other side of the Earth and to choose the best satellite constellation to give the most accurate position estimate in the constellation.

While the invention has been particularly shown and described with reference to a preferred embodiment thereof, it will be understood by those skilled in the art that various changes in form and details may be made therein without departing from the spirit and scope of the invention as defined in the appended claims.

Other aspect, objects, and features of the present invention can be obtained from a study of the drawings, the disclosure, and the appended claims.

We claim:

1. A system for estimating the terrestrial position of a vehicle, comprising:
   means for receiving electromagnetic signals from a plurality of sources and responsively producing respective ranges from each of said sources to said vehicle and respective positions of each of said sources;
   means for projecting the position of one of said sources to the opposite side of the Earth with respect to the center of the Earth and responsively determining a projected position;
   means for receiving said projected position and responsively producing a projected range;
   means for receiving said projected range and the ranges from the other sources and responsively determining the position of said vehicle.

2. The system of claim 1, wherein said respective positions are determined with respect to a reference plane.

3. The system of claim 2, wherein said reference plane includes two known locations on the Earth.

4. The system of claim 3, including:
   a base station, and
   wherein one of said known locations corresponds to said base station.

5. The system of claim 1, wherein the positions of said sources are defined in Cartesian coordinates.

6. The system of claim 5, wherein the position of said one source is defined as $X_m, Y_m, Z_m$, and wherein said projected position is determined by:
   $X'_m = -X_m$
   $Y'_m = -Y_m$, and
   $Z'_m = -Z_m$.

7. The system of claim 1, wherein said sources include at least four satellites from a global positioning system.

8. The system of claim 1, wherein said sources include satellites from a global positioning system and at least one pseudolite.

9. The system of claim 1, including a base station at a known location, said base station includes a reference receiver and means for determining spatial biases.

10. The system of claim 9, wherein said spatial biases are communicated back to said vehicle.

11. The system of claim 9, wherein said base station includes means for determining estimated pseudoranges, actual pseudoranges and clock biases from said sources to said reference receiver.

12. The system of claim 11, wherein said spatial biases are determined by subtracting said estimated pseudoranges and said clock biases from said actual pseudoranges.

13. The system of claim 9, wherein said base station includes means for determining pseudoranges and clock biases from said sources to said reference receiver and wherein said spatial biases are determined by subtracting an associated value on a parabolic model and one of said clock biases from a respective pseudorange, said parabolic model being constructed over time from prior pseudoranges.

14. The system of claim 9, wherein said spatial biases are determined by a difference between the known location of said base station and an estimated value of the location of said base station.

15. The system of claim 9, wherein said spatial biases are communicated back to said vehicle.

16. A system for estimating the terrestrial position of a vehicle, comprising:
  means for receiving electromagnetic signals from a plurality of sources and responsively producing respective ranges from each of said sources to said vehicle and respective positions of each of said sources;
  means for projecting the position of one of said sources to the opposite side of the Earth with respect to the center of the Earth and responsively determining a projected position;
  means for receiving said projected position and responsively producing a projected range;
  means for receiving said projected range and the ranges from the other sources and responsively producing a first position estimate of said vehicle;
  means for producing a second position estimate, said second position estimate producing means including an odometer and an inertial reference unit; and,
  means for receiving said first and second position estimates and responsively producing a third position estimate.

17. The system of claim 16, wherein said first position estimate producing means includes a Kalman filter.

18. The system of claim 16, wherein said third position estimate producing means includes a Kalman filter.

19. The system of claim 16, wherein said third position estimate producing means includes a weighted combiner.

20. The system of claim 16, wherein said third position estimate producing means includes a Kalman filter and a weighted combiner.

21. The system of claim 16, wherein said respective positions are determined with respect to a reference plane, said reference plane includes two known locations on the Earth and including a base station and wherein one of said known locations corresponds to said base station.

22. The system of claim 16, wherein the positions of said sources are defined in Cartesian coordinates and wherein the position of said one source is defined as $X_m, Y_m, Z_m$ and wherein said projected position is determined by:
$X'_m = -X_m$
$Y'_m = -Y_m$, and
$Z'_m = -Z_m$.

23. The system of claim 16, wherein said sources are composed of at least four satellites from a global positioning system.

24. The system of claim 16, wherein said sources are composed of four satellites from a global positioning system and at least one pseudolite.

25. The system of claim 16, including a base station at a known location, said base station including a reference receiver and adapted for determining spatial biases.

26. The system of claim 16, wherein said spatial biases are communicated back to said vehicle.

27. A method for estimating the position of a vehicle, including:
  receiving electromagnetic signals from a plurality of sources and responsively producing respective ranges from each of said sources to said vehicle and respective positions of each of said sources;
  projecting the position of one of said sources to the opposite side of the Earth with respect to the center of the Earth and responsively determining a projected position;
  receiving said projected position and responsively producing a projected range;
  receiving said projected range and the ranges from the other sources and responsively determining the position of said vehicle.

28. A method for estimating the position of a vehicle, including:
  receiving electromagnetic signals from a plurality of sources and responsively producing respective ranges from each of said sources to said vehicle and respective positions of each of said sources;
  projecting the position of one of said sources to the opposite side of the Earth with respect to the center of the Earth and responsively determining a projected position;
  receiving said projected position and responsively producing a projected range;
  receiving said projected range and the ranges from the other sources and responsively producing a first position estimate;
  receiving signals from an odometer and an inertial reference unit and responsively producing a second position estimate; and,
  receiving said first and second position estimate and responsively producing a third position estimate.

* * * * *